J. P. DAHLEN.
GATE.
APPLICATION FILED MAY 28, 1908.

929,836.

Patented Aug. 3, 1909.
2 SHEETS—SHEET 2.

Witnesses
Oliver W. Holmes
E. B. McBath

Inventor
John P. Dahlen
By O'Meara & Burch
Attorney

UNITED STATES PATENT OFFICE.

JOHN P. DAHLEN, OF IDAHO FALLS, IDAHO.

GATE.

No. 929,836.  Specification of Letters Patent.  Patented Aug. 3, 1909.

Application filed May 28, 1908. Serial No. 435,451.

*To all whom it may concern:*

Be it known that I, JOHN P. DAHLEN, a citizen of the United States, residing at Idaho Falls, in the county of Bingham and State of Idaho, have invented a new and useful Improvement in Gates, of which the following is a specification.

This invention relates to a gate mounted to swing horizontally and also mounted to lift vertically, these movements being independent of each other. The advantages of such a construction are that when there is snow upon the ground the gate may be lifted vertically a sufficient distance to clear the snow which may be banked against the inner side of the gate, and can then be swung in a horizontal plane in the usual manner, or if it is desired to separate small stock from large stock, as for example, to pass sheep or hogs from a pasture in which there are cattle or horses, the gate may be lifted vertically a sufficient distance to permit the passage of the smaller animals, and at the same time preventing the larger animals from following.

My invention consists of the novel features of construction hereinafter described, pointed out in the claims, and shown in the accompanying drawings, in which,—

Figure 1:
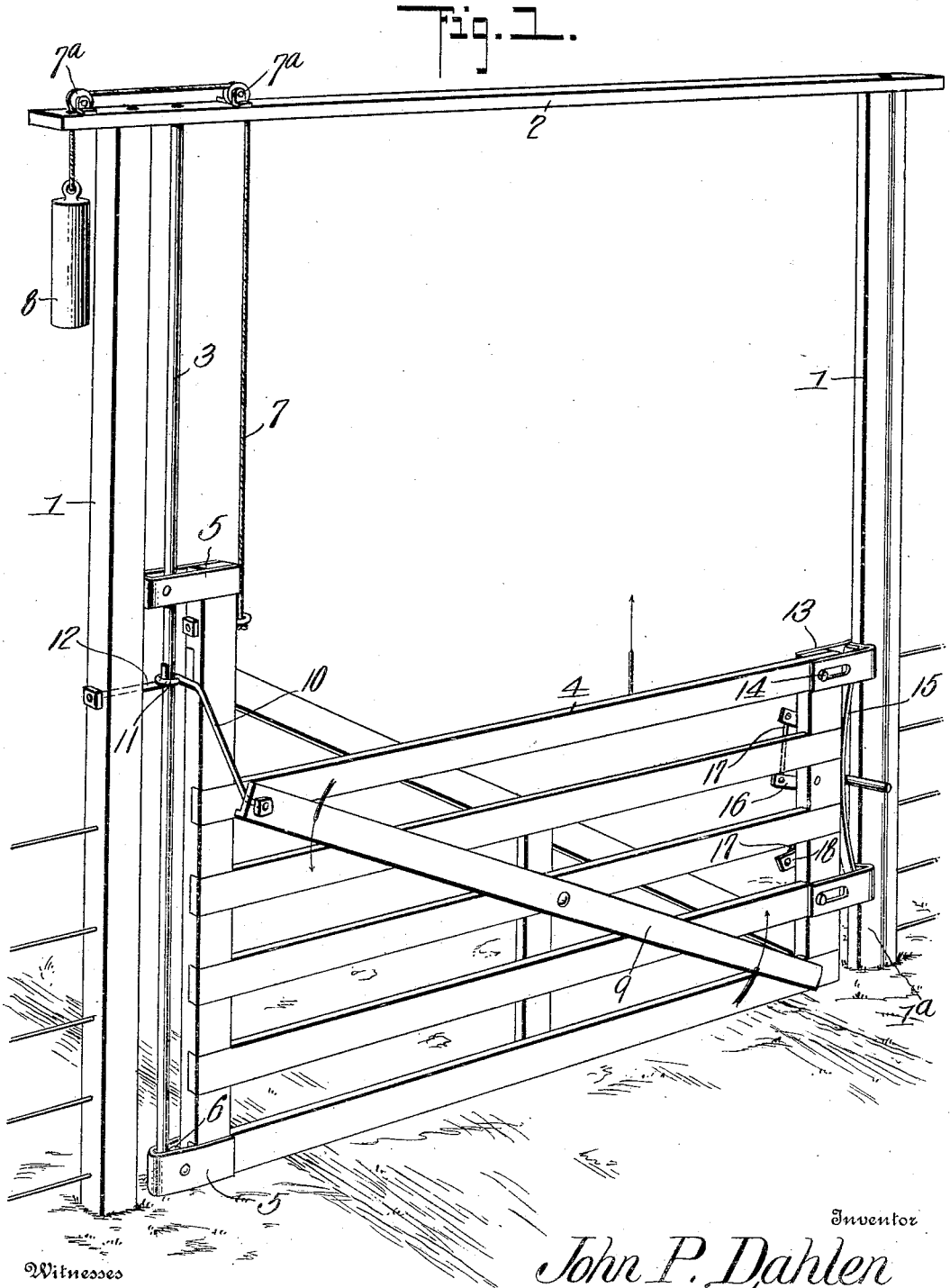
Figure 2:
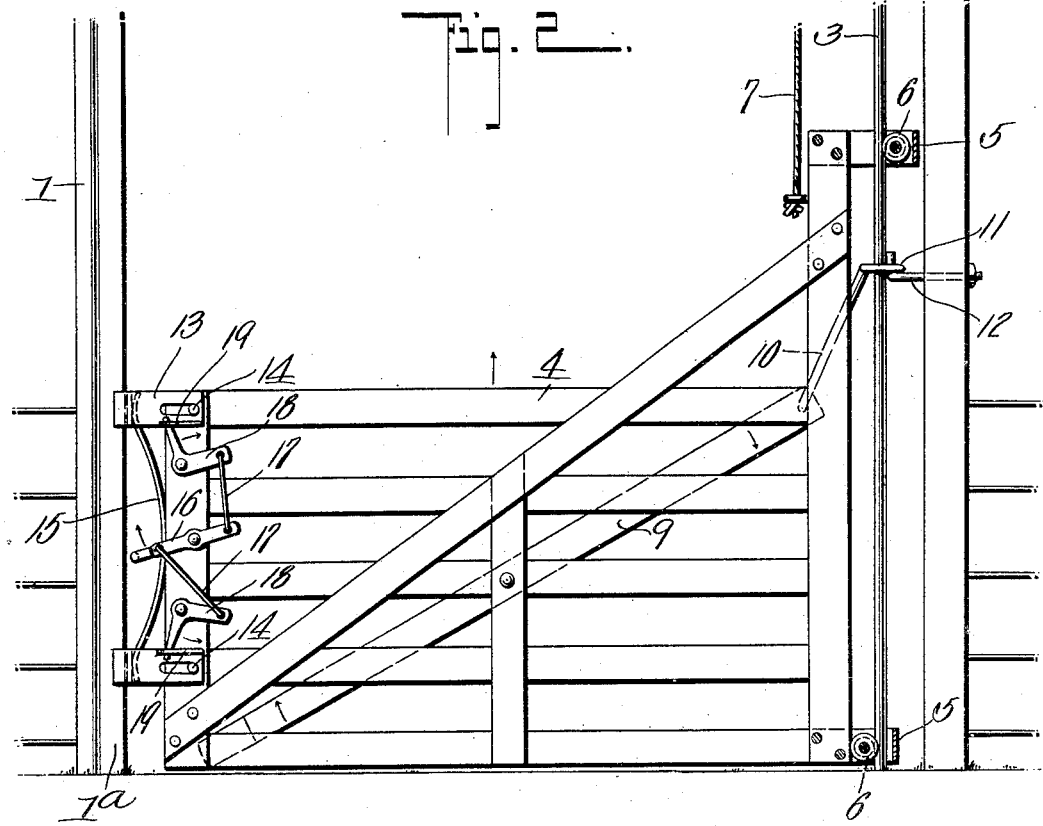
Figure 3:
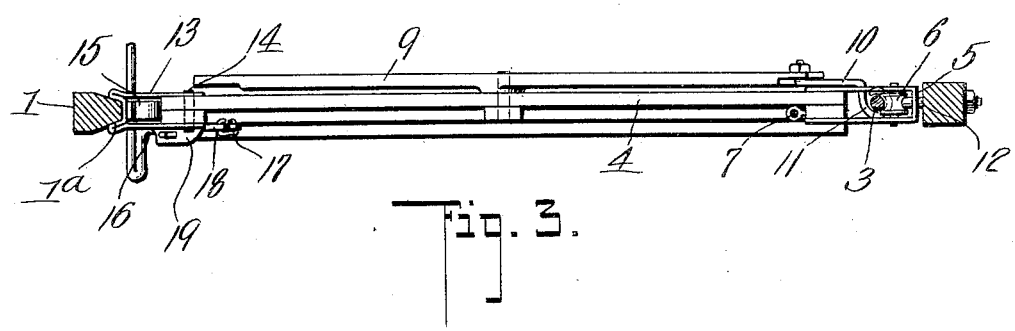

Figure 1 is a perspective view of my gate. Fig. 2 is a side elevation, as seen from the outer side. Fig. 3 is a plan view of the gate, the gate posts and the gate rod being shown in section.

In all of these views the gate is shown in a locked and closed position.

In constructing the gate I employ upright posts 1 higher than the average gate post and connected at the top by a cross piece 2. Adjacent one of the posts is mounted a guide rod 3. A gate 4 is constructed in the usual manner by means of suitable cross bars, uprights and braces, the exact construction of the gate not being material. At one end the gate carries U-shaped metal plates 5 which impress the rod 3 and in these U-shaped plates are journaled rollers 6 which I prefer to place upon opposite sides of the rod 3, placing the upper roller 6 between the rod and the bow portion of the upper plate 5, in order that there may be no binding during upward movement of the gate. Where the gate 4 is of large size and correspondingly heavy, I attach a cable 7 to the hinged end of the gate, which is the end provided with the members 5 and rollers 6, and this cable runs over suitable pulleys 7ª mounted on the cross beam 2 and carries at its free end a counterbalance weight 8. A gate so mounted would swing horizontally in the usual manner turning upon the rod 3 as a pintle, and to afford an easy means for lifting the gate vertically I provide a lever 9 pivotally secured to the central portion of the gate and extending diagonally across the gate when in its normal position. The upper end portion of this lever has secured to it a rod 10 provided with an eye 11 which encircles the rod 3 and also the upturned end portion of a bolt 12 passed through the adjacent post 1, and which forms a hook member which engages the eye 11 of the rod 10.

With a construction of this kind by lifting the free end of the lever 9 the gate will be moved vertically, the lever turning upon its central pivot point and as the gate ascends vertically the lever 9 would assume a horizontal position parallel to the gate. The higher the free end of the lever 9 is lifted the higher the bottom of the gate will be moved from the ground. In order to provide for such vertical movement without at the same time having the gate swung in a horizontal plane, and to guide and steady any vertical movement of the non-hinged end of the gate, I provide the following described locking means. Upon the free end of the gate mounted one above the other are two horizontally sliding clips 13, formed of U-shaped pieces of metal having their bow portions bent inwardly so that the clips overlap opposite sides of the adjacent gate post 1, and this post I prefer to bevel as shown at 1ª. These clips are slotted and pins 14 carried by the gate project into said slots. A curved spring 15, has its bow portion engaging the upright end member of the gate and its free end portions engage the clips and hold them in frictional contact with the post. Between the clips 13 I mount upon the gate a lever 16 which is connected by suitable links 17 to bell crank levers 18, which levers engage suitable flanges 19 formed upon the clips 13. The clips 13 form latches for the gate and when in engagement with the post not only prevent the gate from swinging in a horizontal plane, but also serve as guides during vertical movement of the gate. When the gate is to be swung into an open position it is only necessary to lift an end of the lever 16, and this will through the link 17 rock the bell crank 18, which in turn will slide the clips 13 against the pressure of the spring 15 causing the clips to clear the post and permitting the gate to be swung open in the usual manner.

Having thus fully described my invention, what I claim as new and desire to secure by Letters Patent is:—

1. A device of the kind described comprising vertically arranged posts, a guide rod adjacent one post, a gate mounted to swing upon said rod and to move vertically upon it, a lever pivotally mounted upon the gate, means for securing one end of said lever to the post adjacent the guide rod, said securing means turning upon said guide rod, slidable U-shaped clips carried by the free end of the gate and engaging the adjacent gate post, a spring holding said clips in engagement with the posts, a lever, and means operable by movement of said lever for withdrawing the clips from engagement with the posts.

2. A device of the kind described comprising vertically arranged posts, a gate movable vertically between the posts, a counterbalance weight connected to one end of the gate, a lever pivotally mounted to the gate, means for securing one end of said lever to one of the posts, slidable U-shaped clips carried by the gate, a spring having its bow portion bearing upon the free end of the gate, and its ends engaging said clips forcing them into engagement with the other post, said clips overlapping the sides of the post, bell crank levers engaging said clips, a hand operable lever, and links connecting said lever to said bell cranks as and for the purpose set forth.

JOHN P. DAHLEN.

Witnesses:
O. A. JOHANNESEN,
J. J. JOHANNESEN.